Oct. 13, 1931.

W. A. MARQUA

VELOCIPEDE

Re. 18,225

Original Filed Feb. 12, 1929

Inventor:
William A. Marqua,
by John Elias Jones
Attorney.

Reissued Oct. 13, 1931 Re. 18,225

UNITED STATES PATENT OFFICE

WILLIAM A. MARQUA, OF CINCINNATI, OHIO, ASSIGNOR TO THE FRANK F. TAYLOR COMPANY, INCORPORATED, OF CINCINNATI, OHIO, A CORPORATION OF OHIO

VELOCIPEDE

Original No. 1,778,116, dated October 14, 1930, Serial No. 339,352, filed February 12, 1929. Application for reissue filed February 11, 1931. Serial No. 515,146.

This invention relates to the foot-pedaled type of velocipedes in which there is a fore swivel driving-and-steering wheel and a pair of rear supporting-wheels that are mounted to turn on a transverse axle and the latter duly mounted at the tail end of a reach or backbone that forms the main part of the customary frame of the said foot-pedaled vehicle.

It is an object of this invention to provide a velocipede having a frame comprising a transverse member and a backbone member attached at one end to the middle of the transverse member, and a step means at each side of and to the rear of the backbone member.

The essential feature or prime object and consistency of the invention herein is the provision of a master-casting or block-member having an upright socket-extension adapted to detachably or otherwise receive or accommodate the depending tail end or lower extermity of the main reach-member or backbone of the vehicle frame, a pair of laterally-extending housing or casing members for accommodating the transverse rear axle so as to duly support the said frame on said axle whose outer ends form spindles for the rear-wheel hubs, with the inner edges of the latter bearing in revoluble thrust-contact with the opposite ends of the said housing or casing members, and a rearwardly-extending step-member on said master-casting that has lateral wings or side-braces preferably cast or made integral with the said axle housing or casing members and all well adapted, in a very simple, effective and inexpensive manner, to dispense with the usual forked or double rear end of the vehicle reach or backbone that has blocked the way of safe, free and easy passage of the user to and from driving position on the rider's seat from the rear of the vehicle, and, also, to provide said side-braces on the said intermediate master-casting for properly supporting the frame in an upright manner on the axle instead of depending on said formerly used forked rear ends of the reach for any leaning or tipping of the frame sidewise, the details of all of which elements will be carefully referred to in the following description of the accompanying sheet of drawings that show the invention herein in its simplest and best form, and in which—

Figure 1:
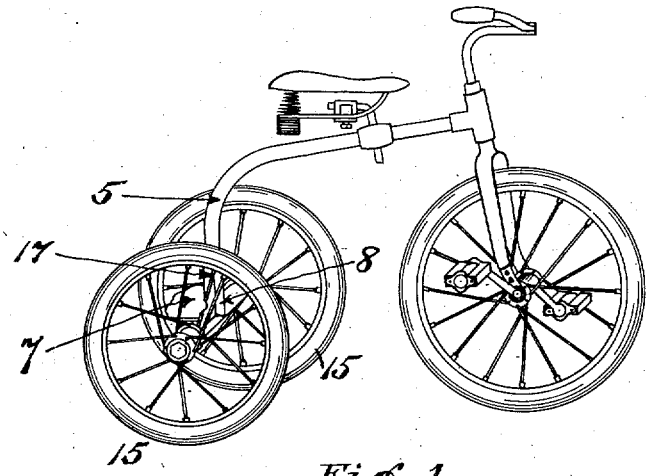
Figure 2:
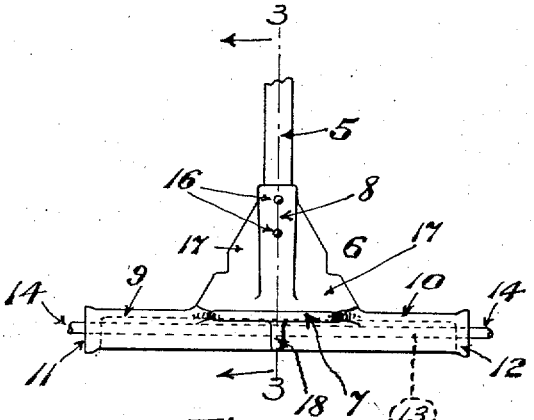
Figure 3:
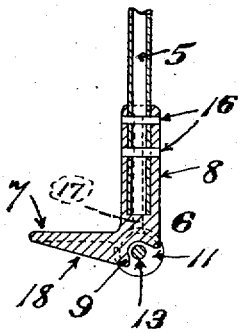
Figure 4:
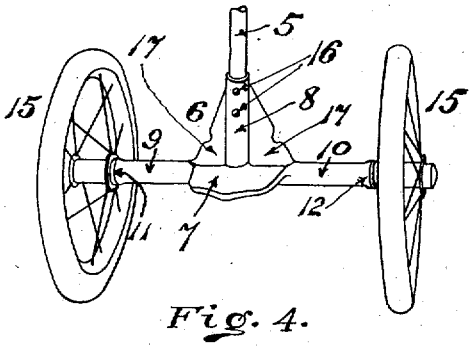

Figure 1 is a fore-front perspective of the tricycle to the rear end of which my invention is applied; Fig. 2, a fragmentary transverse elevation of the rear end of the mounting part of the vehicle showing my invention on a larger scale and more clearly than what is shown in said Fig. 1, the view disclosing the opposite ends of the axle broken off a short distance back of their bearing-heads in the opposite outer ends of the aforesaid laterally-extending axle housing or casing members of the said central master-casting and with the seated or deeply socketed lower or tail end of the main reach-member or backbone of the frame broken off shortly above its said seated extremity; Fig. 3, a central vertical section taken on the dotted-line 3, 3 of Fig. 2 and aimed to better display the rearwardly-extending step or foot-rest on its integral master-casting or block-member and the rear axle supports; and Fig. 4, a rear-end perspective of the vehicle, showing only the essential part of the invention herein, with the fore part of the vehicle omitted and with the said reach or backbone shown broken off shortly above the said lower deep socketed or seated end thereof.

This invention having to do only with the rear end of the vehicle it will be unnecessary to refer in detail to any of the steering, driving or seating parts of the vehicle that lie forward of the verticle, depending rear end or lower extremity 5 of of the said longitudinal reach or backbone-member of the frame.

6 indicates (taken as a whole) a master-casting or major block-member that is preferably (but not essentially) made integral with a rearwardly-extending horizontal step-member 7, together with an upright central socket-member 8 and a pair of lateral, oppositely extending semicircular (cross section) housing or casing members 9 and 10, and with the latter members 9 and 10 having circular outer ends or heads 11 and 12, respectively, for the outward extension of the thereby housed transverse axle-member 13, the extreme outer ends 14 of the axle forming the usual spindles for the rotary-mounting thereon of the rear supporting-wheels 15, 15. The casing members 9 and 10 form a transverse member to the center of which the backbone member is attached, and to which the step 7 is attached for lateral and rearward extension with respect to the backbone member 5.

The said central socket-member 8 is adapted to deeply seat the lower extremity or tail end 5 of the continuous reach or tubular backbone in a firm and substantial manner, transverse bolts or the like 16 being used to secure the joint in a detachable or other suitable manner, as desired.

Laterally-extending webs or sloping braces 17, 17, are provided on the said upright socket-member 8 and are preferably made integral therewith and with the outwardly-extending lateral housing or casing members 9 and 10. These braces take the place of the commonly used forked rear ends of the vehicle reach or backbone-member in avoiding side tilts of the vehicle and, also, in duly strengthening or reinforcing the connection or joint between the said vertical socket-member 8 and the said semicircular (cross-section) axle housing or casing members 9 and 10. It is quite obvious, however, that the said master-casting can be made separately, with but the step or foot-rested and the socket members thereof made integral and with the said braces and housing-members made independent ones but all adapted to being duly secured together by means of bolts or rivets in any desirable manner and with lateral ears or flanges, or by means of straps, on the said upright socket-member for securing the latter on the rear reach extremity 5, but such a divided structure would not be stable or reliable, as is the one-piece feature shown and that is materially cheaper and better in every reasonable and practicable way.

There being no forked rear ends on the reach of the vehicle herein it is evident that the single reach extremity 5, together with the narrow tapering side-braces 17, 17, of its securing-socket, provide an ample and safe gap at either side of the center of the vehicle rear for the usual juvenile user or child to enter or leave the driver's seat or saddle without obstruction to his feet or clothing and without danger of tripping or stumbling forward or backward, the parts comprising my invention duly forming a decided feature of substantial design and attractive appearance, especially from a selling point-of-view, the latter condition being very desirable when the device is usually considered or listed in the toy or play line for children's use.

The said axle-bearing eye-ends 11 and 12 form desirable surfaces or abutments for receiving the end-thrust inwardly of the inner ends of the wheel hubs at the opposite outer ends of the said housing or casing members 9 and 10, and thereby constitute somewhat important parts of my improvement in the proper mounting of the said rear wheels on the rear axle for the upright support of said wheels at all times against wobble or sagging.

18 indicates a vertical reinforcing-bracket on the bottom of the said step-member 7 to brace it against bending or crushing downwardly under the weight of the user in mounting or dismounting to and from his seat.

It will be understood that I desire to comprehend within my invention such modifications as may be necessary to adapt it to varying conditions and uses.

I claim:

1. In a tricycle, a central master casting having a rearwardly-extending step and provided with an upright socket for the deep-seating attachment of the lower extremity of the reach of the vehicle frame and with lateral axial-extensions at whose opposite outer ends the supporting rear wheels of the vehicle are journaled.

2. In a tricycle, a central master-casting having a rearwardly-extending horizontal step-member and provided with an upright extension for the attachment of the lower extremity of the reach of the vehicle frame and lateral side-extensions having ribbed reinforces for accommodating the laterally-extended axles to rotatably support the rear wheels.

3. In a tricycle, a rearwardly-extending step-member located between the rear supporting-wheels and comprising a master casting having an upright extension flanked by a pair of laterally-extended suitably ribbed or reinforced axle-casing members on said master-casting for the rear axle and abutments for the wheel hubs and a downwardly-extending reinforcing brace-member for said step-member.

4. In a tricycle having a master casting mounted on its rear axle, said casting having an integral rearwardly extending step at its lower end, and the casting being further provided with an upright extension for supporting the depending tail end of the reach of the tricycle.

5. In a tricycle, a steering fork, a steering wheel mounted therein, a backbone member connected thereto, a transverse member to which said backbone member is connected centrally, wheels at either end of said transverse member, and a step on said transverse member, said step being arranged on both sides of said backbone member at its point of junction with the transverse member.

6. In a tricycle, a transverse member, a backbone member supported at its forward end by a steering wheel and connected at its rear end to said transverse member, said transverse member having a wheel at each end thereof, a step fixedly mounted on said transverse member and arranged on both sides of the connection of said backbone member to the transverse member.

7. In a tricycle, a backbone member, a transverse member connected to said backbone member, and a step on the transverse member and extending laterally on both sides of the backbone member.

8. In a tricycle, a transverse member supported at each end having a wheel on each end spaced from a backbone member, a backbone member extending up from the transverse member, step means on the transverse member to the rear of backbone member and on each side thereof, and a web on each side of the backbone member and extending up from the front edge of the step means.

9. In a velocipede, a transverse member for supporting a rear axle having an upwardly extending socket member, a rearwardly extending step mounted on said transverse member, and a web between each side of the socket member and the transverse member, said web serving as a brace and stop for feet on the step.

10. In a velocipede, a transverse member for supporting a rear axle and having an upwardly extending socket member, a rearwardly extending step mounted on said transverse member, and a web on the front of the step to serve as a foot guard.

11. In a velocipede, a backbone member, an axle-supporting transverse member connected to said backbone member, a rearwardly extending step mounted on the transverse member, and an upwardly extending web mounted on the front part of the step.

In testimony whereof I have signed my name.

WILLIAM A. MARQUA.